(12) United States Patent
Hirata

(10) Patent No.: US 10,150,152 B2
(45) Date of Patent: Dec. 11, 2018

(54) SHEET METAL FORMING METHOD AND APPARATUS

(71) Applicant: TOYOTA BOSHOKU KABUSHIKI KAISHA, Aichi-ken (JP)

(72) Inventor: Kazuyuki Hirata, Toyota (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/814,971

(22) Filed: Nov. 16, 2017

(65) Prior Publication Data

US 2018/0154416 A1    Jun. 7, 2018

(30) Foreign Application Priority Data

Dec. 7, 2016    (JP) ................ 2016-237735

(51) Int. Cl.
| | |
|---|---|
| *B21D 13/02* | (2006.01) |
| *H01M 8/026* | (2016.01) |
| *B21K 23/00* | (2006.01) |
| *H01M 8/025* | (2016.01) |
| *B21D 11/08* | (2006.01) |
| *B21D 24/02* | (2006.01) |
| *B21D 28/26* | (2006.01) |
| *H01M 8/0208* | (2016.01) |
| *H01M 8/0254* | (2016.01) |

(52) U.S. Cl.
CPC ............ *B21D 13/02* (2013.01); *B21D 11/085* (2013.01); *B21D 24/02* (2013.01); *B21D 28/26* (2013.01); *B21K 23/00* (2013.01); *H01M 8/025* (2013.01); *H01M 8/026* (2013.01); *H01M 8/0208* (2013.01); *H01M 8/0254* (2013.01)

(58) Field of Classification Search
CPC ...... B21D 13/02; B21D 11/085; B21D 24/02; B21D 28/26; B21D 13/10; H01M 8/0208; H01M 8/025; H01M 8/026; B21K 23/00
USPC .......................................................... 72/385
See application file for complete search history.

(56) References Cited

U.S. PATENT DOCUMENTS

| | | | | |
|---|---|---|---|---|
| 2,186,288 | A * | 1/1940 | Gallagher | B21D 13/02 72/385 |
| 2,822,854 | A * | 2/1958 | Berg | B21D 1/00 72/385 |
| 4,077,247 | A * | 3/1978 | Stewart | B21D 13/10 29/896.6 |
| 8,828,622 | B2 * | 9/2014 | Fujimura | H01M 8/026 429/512 |
| 9,630,229 | B2 * | 4/2017 | Hirata | B21D 13/02 |

(Continued)

FOREIGN PATENT DOCUMENTS

| | | |
|---|---|---|
| JP | 2007-48616 | 2/2007 |
| JP | 2014-213343 | 11/2014 |

*Primary Examiner* — David B Jones
(74) *Attorney, Agent, or Firm* — Greenblum & Bernstein, P.L.C.

(57) ABSTRACT

A fixed die and a punch, which moves toward and away from the die, are provided. A series of bulges is formed in sheet metal between depressions and projections of the die and projections and depressions of the punch. In forming, the punch moves toward the die such that the sheet metal is pressed between first convex sections and second and third convex sections of the die and the punch, and subsequently the sheet metal is pressed between fourth convex sections.

8 Claims, 4 Drawing Sheets

(56) References Cited

U.S. PATENT DOCUMENTS

2002/0112811 A1* 8/2002 Beauvois ............... B21D 13/02
　　　　　　　　　　　　　　　　　　　156/199
2015/0290692 A1* 10/2015 Hirata .................... B21K 23/00
　　　　　　　　　　　　　　　　　　　72/379.6

* cited by examiner

SHEET METAL FORMING METHOD AND APPARATUS

BACKGROUND OF THE INVENTION

The present invention relates to a sheet metal forming method and a sheet metal forming apparatus for forming a series of bulges, which forms projections and depressions, in sheet metal using a forming apparatus including a die and a punch.

A conventional fuel cell separator is made of sheet metal including a plurality of bulges forming flow paths for hydrogen and oxygen. Japanese Laid-Open Patent Publication No. 2007-48616 and Japanese Laid-Open Patent Publication No. 2014-213343 disclose forming methods and forming apparatuses for such fuel cell separators. The forming apparatuses of these publications each include upper and lower forming dies that move toward and away from each other. The forming dies have forming surfaces including projections and depressions. The projections of one of the forming dies correspond to the depressions of the other die. These depressions and projections form bulges of the sheet metal such that the bulges alternately extend in the opposite directions.

The technique disclosed in Japanese Laid-Open Patent Publication No. 2007-48616 involves a prior stamping process, which forms depressions and projections using upper and lower forming dies so that the sheet metal is corrugated and has a series of curved bulges, and a subsequent coining process, which forms flat surfaces in the top sections of the bulges in the corrugated sheet metal.

The technique disclosed in Japanese Laid-Open Patent Publication No. 2014-213343 involves first to third steps to form sheet metal. The first step performs stretching process to form the top sections of the bulges of the corrugated sheet metal to be thinner than other parts. The second step performs rolling to form the side walls of the bulges. The third step expands the top sections of the bulges.

The technique of Japanese Laid-Open Patent Publication No. 2007-48616 requires the coining process after the stamping process. The technique of Japanese Laid-Open Patent Publication No. 2014-213343 requires three steps of the first to third steps. The techniques of these publications require a plurality of different steps, resulting in lower productivity and extensive production equipment. In addition, a plurality of processing steps is performed on the same sheet metal, possibly inflicting serious damage to the sheet metal. This may reduce the strength and the life of the product made of the sheet metal.

In the technique of Japanese Laid-Open Patent Publication No. 2007-48616, during the prior stamping process, the sheet metal is pressed by the projections of the forming dies but is not in contact with the depressions. Accordingly, a compression force is not applied to the parts of the sheet metal that have been formed, and the projections apply tension to the sheet metal. In the subsequent coining process, since the side walls of the depressions and the projections are raised, the two forming dies moving toward each other do not exert much compression on the side walls of the bulges of the sheet metal, although they exert friction on the side walls.

In the technique of Japanese Laid-Open Patent Publication No. 2014-213343, the first step stretches the sheet metal and forms tall bulges, and these bulges are processed in a different step. That is, the techniques of Japanese Laid-Open Patent Publication No. 2007-48616 and Japanese Laid-Open Patent Publication No. 2014-213343 preferentially apply tension to the sheet metal. This may partially reduce the thickness of the sheet metal and cause necking in the stretched side walls of the bulges or other sections, which degrades the performance of the formed products.

Further, in the techniques of Japanese Laid-Open Patent Publication No. 2007-48616 and Japanese Laid-Open Patent Publication No. 2014-213343, the outer surfaces of the top sections of the bulges of the formed sheet metal are flat. Accordingly, when the sheet metal is used as a fuel cell separator, the area of contact between the outer surfaces and a diffusion layer of the fuel cell may not be large enough. Accordingly, the internal electrical resistance of the fuel cell increases, and the pressure on diffusion layers per unit area increases. Thus, the diffusion layer, which is made of a flexible material, may be excessively deformed. This may degrade the performance of the fuel cell.

SUMMARY OF THE INVENTION

It is an objective of the present invention to provide a sheet metal forming method and a sheet metal forming apparatus that reduce the number of processing steps performed on sheet metal.

To achieve the foregoing objective and in accordance with one aspect of the present disclosure, a sheet metal forming method is provided that uses a pair of first and second forming dies, which move toward and away from each other, such that the sheet metal includes bulges, which form a series of projections and depressions and each include inclined side walls. The method includes: pressing the sheet metal with first convex surfaces of the first forming die by moving the first and second forming dies toward each other; and thereafter, with second convex surfaces of the second forming die, pressing parts of the sheet metal that are opposite to parts that have been pressed by the first convex surfaces, and pressing the side walls between inclined surfaces of the first and second forming dies.

A sheet metal forming apparatus according to the present disclosure includes a pair of first and second forming dies, which are moved toward and away from each other to form a sheet metal. The first and second forming dies each have a forming surface including a series of alternate depressions and projections. An inclined surface is located on each side of each of the depressions and the projections. Bottom sections of the depressions and top sections of the projections include convex surfaces that face each other.

The side walls are inclined so as to form obtuse angles with the top sections of the bulges. In addition, the inclined surfaces are inclined so as to form obtuse angles with the bottom sections of the depressions and the outer side surfaces of the projections.

DETAILED DESCRIPTION OF THE PREFERRED EMBODIMENTS

One embodiment of the present invention will now be described with reference to the drawings.

First, the structure of sheet metal 21 is described.

Figure 1:
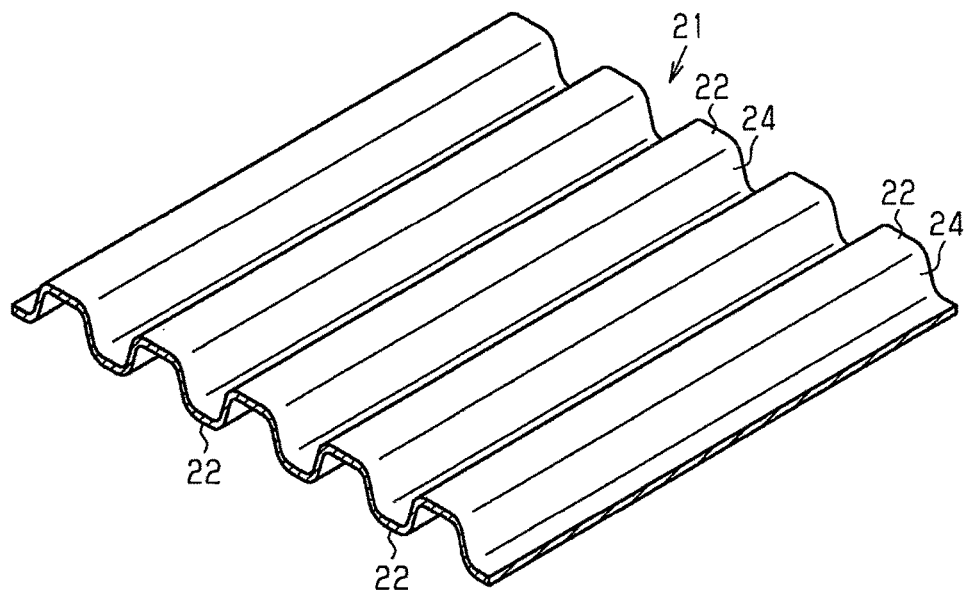
FIG. 1 is a perspective view showing sheet metal formed as a separator.
Figure 2:
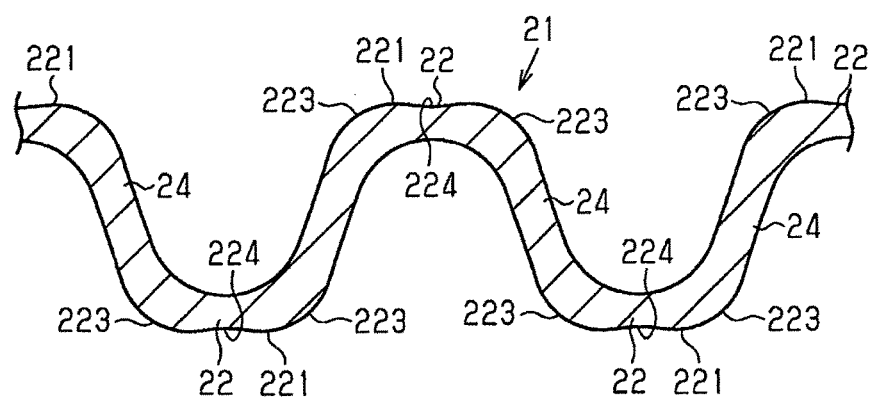
FIG. 2 is a cross-sectional view showing the sheet metal formed as a separator.

As shown in FIGS. 1 and 2, the front and back surfaces of the sheet metal 21, which serves as a fuel cell separator, each include a plurality of pleat-shaped bulges 22 extending alternately in the opposite directions so that the sheet metal 21 includes depressions and projections. The sheet metal 21 is made of a material having a high corrosion resistance, such as titanium, titanium alloy, or stainless steel.

As shown in FIG. 2, each bulge 22 includes a top section 221 and inclined side walls 24, which are on the opposite sides of the top section 221 and continuous with the top section 221. The bulge 22 has a trapezoidal cross-section. Each side wall 24 extends so as to form, as a whole, an obtuse angle with the center line in the width direction of the top section 221. The boundary sections 223 between the top section 221 and the side walls 24 are convex surfaces. The top sections 221 include central sections 224, which are concave surfaces.

The upper and lower sides in the present embodiment are specified only for descriptive purposes. The orientation of the sheet metal 21 in actual use varies, and the sheet metal 21 may be reversed or set vertically. In the present embodiment, the thickness of the two side sections of the top section 221 of each bulge 22 is about 0.20 to 0.05 mm, for example, 0.10 mm. The thicknesses of the central section of the top section 221 and the central sections in the height direction of the side walls 24 of each bulge 22 are about 0.15 to 0.03 mm, for example, 0.07 mm.

The sheet metal 21 is formed using a forming apparatus 30.

Figure 3:
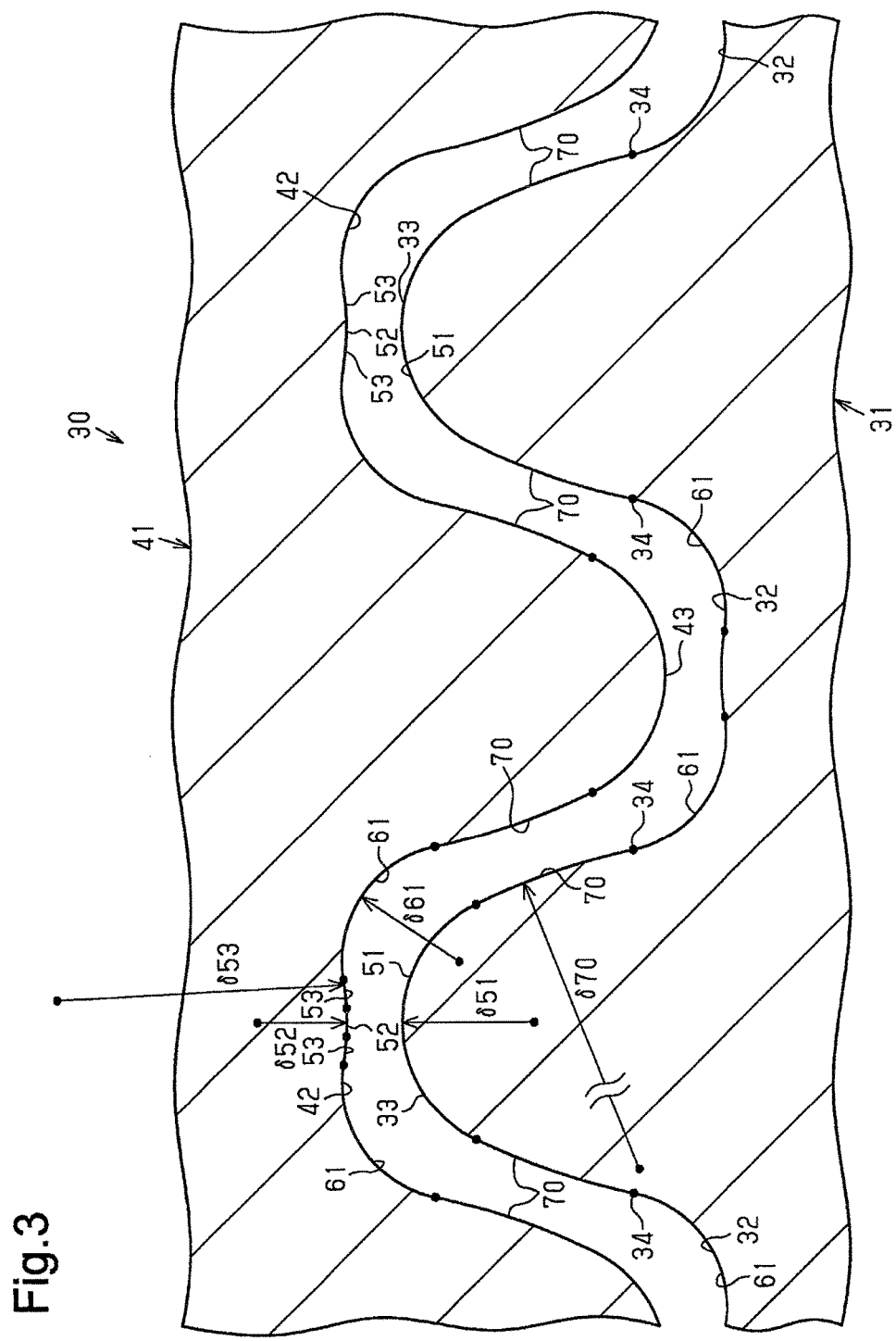
FIG. 3 is a cross-sectional view showing a forming apparatus.

As shown in FIG. 3, the forming apparatus 30 includes a lower die 31, which serves as a forming die, and a punch 41, which serves as a forming die corresponding to the die 31. The punch 41 is able to move toward and away from the die 31 on the upper side of the die 31. In the present embodiment, the die is fixed, and the punch is movable. However, their positional relationship in the vertical direction may be reversed. The upper surface, which forms the forming surface, of the die 31 includes depressions 32 and projections 33, which are alternately arranged at equal intervals. The lower surface, which forms the forming surface, of the punch 41 includes continual projections 43 and depressions 42, which are alternately arranged at equal intervals. The projections 43 and depressions 42 correspond to the depressions 32 and the projections 33, respectively, of the die 31.

The top sections of the projections 33 and 43 of the die 31 and the punch 41 each include a first convex section 51, which serves as a convex surface and has a radius of curvature $\delta 51$. A fourth convex section 70 is located on each side of each top section and forms an inclined surface as a whole. The fourth convex section 70 serves as a convex surface and has a radius of curvature $\delta 70$, which is greater than the radius of curvature $\delta 51$ of the first convex section 51.

The central sections in the width direction of the bottom sections of the depressions 32 and 42 of the die 31 and the punch 41 each include a second convex section 52, which serves as a convex surface and faces a first convex section 51. The second convex section 52 has a radius of curvature $\delta 52$ that is smaller than the radius of curvature $\delta 51$ of the first convex section 51. A third convex section 53, which serves as a narrow convex surface, is located on each side of each second convex section 52. The third convex sections 53 have a radius of curvature $\delta 53$ that is greater than the radii of curvature $\delta 51$ and $\delta 52$ of the first convex sections 51 and the second convex sections 52 and is smaller than the radius of curvature $\delta 70$ of the fourth convex sections 70.

The boundary sections between the fourth convex sections 70 and the opposite sides of the bottom sections of the depressions 32 and 42 include concave sections 61, which serve as concave surfaces. The concave sections 61 have a radius of curvature $\delta 61$ that is greater than the radius of curvature $\delta 52$ of the second convex sections 52 and is smaller than the radius of curvature $\delta 51$ of the first convex sections 51. In the present embodiment, the radius of curvature $\delta 51$ of the first convex sections 51 is in the range of 0.15 to 0.25 mm, for example, 0.19 mm. The radius of curvature $\delta 52$ of the second convex sections 52 is in the range of 0.11 to 0.21 mm, for example, 0.16 mm. The radius of curvature $\delta 53$ of the third convex sections 53 is in the range of 0.35 to 0.45 mm, for example, 0.40 mm. The radius of curvature $\delta 70$ of the fourth convex sections 70 is in the range of 0.10 to 1.50 mm, for example, 0.9 mm. The radius of curvature $\delta 61$ of the concave sections 61 is in the range of 0.12 to 0.22 mm, for example, 0.17 mm.

Straight sections 34 are formed between the fourth convex sections 70 and the concave sections 61. The straight sections 34 have a very short length in the vertical direction (about 0.01 mm).

The opposite ends of each of the convex sections 51 to 53 and 70, the straight sections 34, and the concave sections 61 are smoothly continuous with other sections without forming corners between sections. The dots shown in FIG. 3 indicate a series of points at the opposite ends of sections. The straight sections 34 are short and thus overlap with dots. Here, if each fourth convex section 70 forms an inclined surface as a whole, it means that an imaginary straight line connecting the dots on the opposite ends of the fourth convex section 70 is inclined with respect to the width direction of the depressions 32 and 42.

A forming method is now described that uses the forming apparatus described above.

Figure 4:
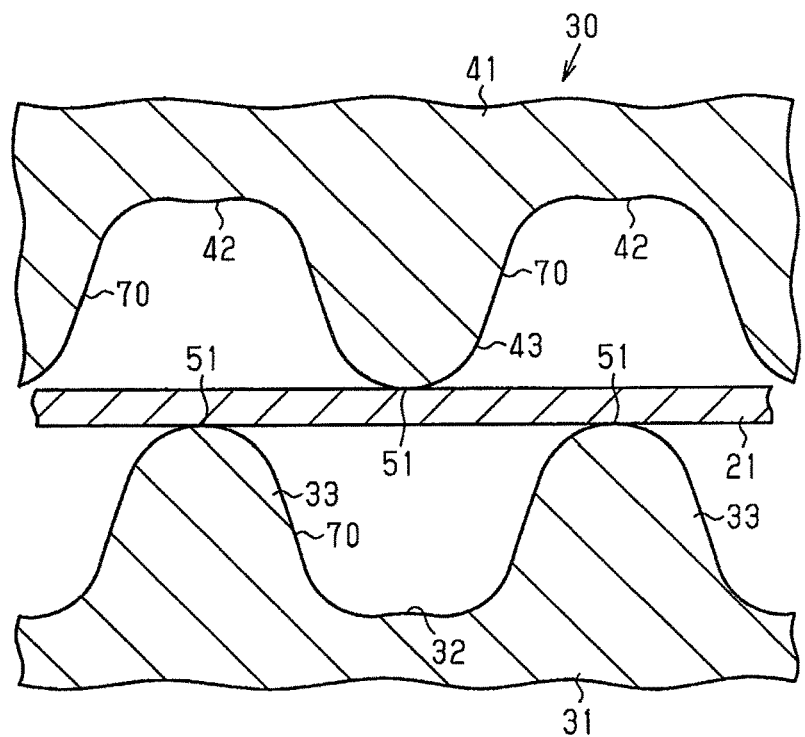
FIG. 4 is a cross-sectional view showing the forming apparatus in the initial stage of forming.

First, as shown in FIG. 4, when the punch 41 is at the top dead center, unprocessed flat sheet metal 21 of a uniform thickness is set on the die 31 of the forming apparatus 30. In the present embodiment, the thickness of the unprocessed flat sheet metal 21 shown in FIG. 4 is about 0.20 to 0.05 mm (millimeter), for example, 0.10 mm.

In this state, the punch 41 moves toward the die 31. The forming of the sheet metal 21 between the depressions 32 and 42 and the projections 33 and 43 of the die 31 and the punch 41 is thus initiated as shown in FIGS. 4 to 6.

Figure 5:
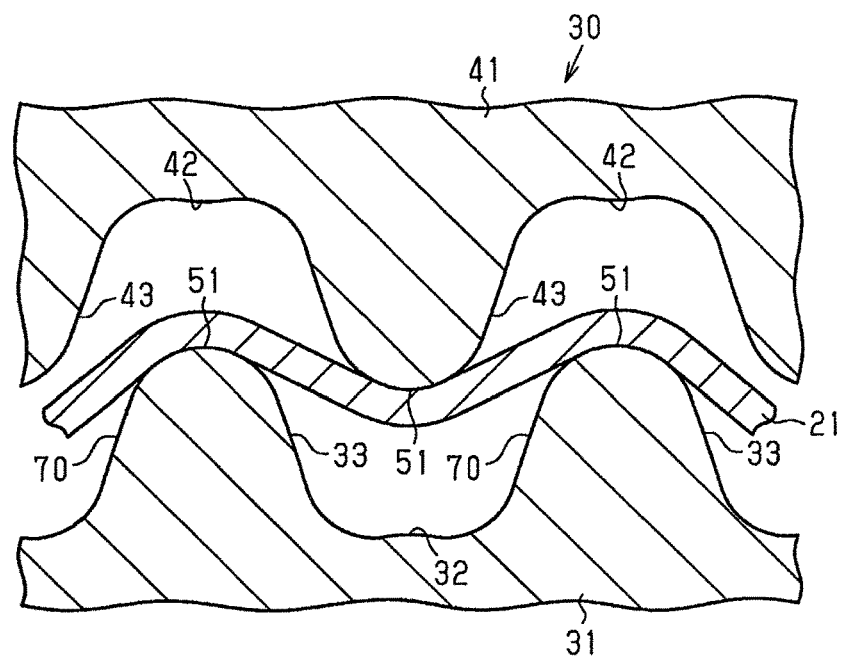
FIG. 5 is a cross-sectional view showing the forming apparatus in the middle stage of forming.

FIGS. 4 and 5 show the initial stage of forming in which the first convex sections 51 of the projections 33 and 43 of the die 31 and the punch 41 are brought into contact with the sheet metal 21 and press the contact parts of the sheet metal 21 that are in contact with the first convex sections 51. This bends the contact parts and moves some of the metal material in the contact parts toward the opposite sides of the contact parts, causing the contact parts to be thinner. That is, bending pressure is applied to the sheet metal 21 so that the sheet metal 21 starts bending with the points of contact with the first convex sections 51 becoming the tops.

Figure 6:
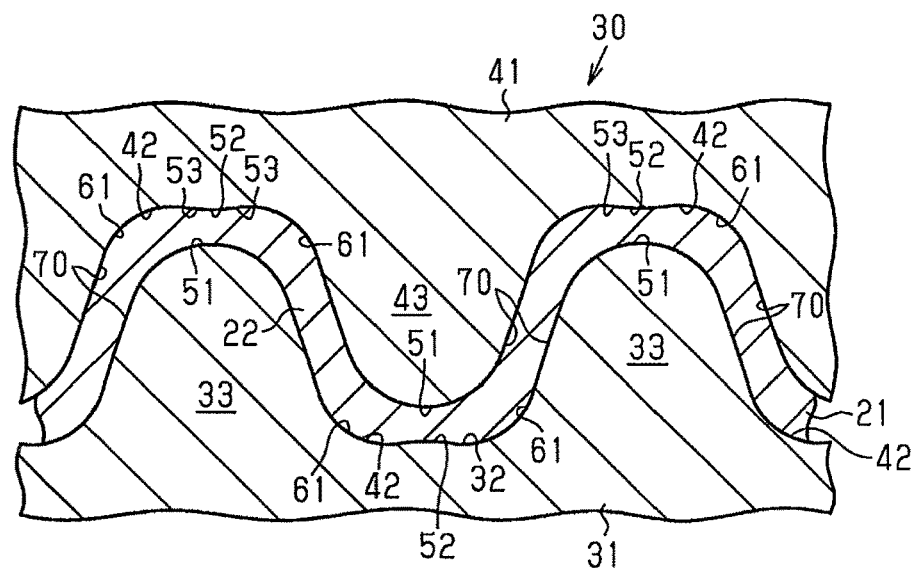
FIG. 6 is a cross-sectional view showing the forming apparatus at the end of forming.

As shown in FIG. 6, when the punch 41 is near the bottom dead center, the surfaces of the parts of the sheet metal 21 that are opposite to the first convex sections 51 are in contact with and pressed by the second convex sections 52 of the depressions 32 and 42, which face the first convex sections 51, so that these parts are pressed between the first convex sections 51 and the second convex sections 52. This further reduces the thickness of the metal material in these parts, causing the metal material in these parts to move toward the concave sections 61 on the opposite sides of these pressed parts.

The metal material that has moved to the opposite sides of the second convex sections 52 is then pressed by the third convex sections 53 and thus moved further toward the fourth convex sections 70. However, since the radius of curvature δ53 of the third convex sections 53 is greater than the radius of curvature δ52 of the second convex sections 52, the force required for bending the corresponding parts is reduced.

Then, the metal material is pressed between the fourth convex sections 70, which are formed between the projections 33 and 43 and the depressions 32 and 42 of the die 31 and the punch 41. The metal material in these parts is rolled and moved toward the top sections of the projections 33 and 43.

When the punch 41 reaches the bottom dead center, the sheet metal 21 is formed that has an appropriate shape and thickness for the separator described above and shown in FIG. 2.

The present embodiment thus achieves the following advantages.

(1) When the punch 41 moves toward the die 31, the first convex sections 51 of the projections 33 and 43 are brought into contact with the sheet metal 21 and press the central sections in the width direction of the bulges 22 of the sheet metal 21. This reduces the thickness of the contact parts of the sheet metal 21 with the first convex sections 51, allowing the metal material to move toward the opposite sides of the contact parts. At the same time, bending force is applied to the sheet metal 21. Then, the sheet metal 21 is brought into contact with the second convex sections 52 and pressed between the first and second convex sections 51 and 52. This further reduces the thickness of the contact parts of the sheet metal 21. The forming of the sheet metal 21 continues in this state, and the sheet metal 21 obtains the required shape when the punch 41 reaches the bottom dead center.

Specifically, when the punch 41 is near the bottom dead center, the second convex sections 52 and the third convex sections 53, which face the first convex sections 51, cooperate with the first convex sections 51 to press the sheet metal 21, so that the metal material in the pressed parts moves toward the concave sections 61 and the fourth convex sections 70. The metal material is rolled between the fourth convex sections 70 of the die 31 and the punch 41 and thus forms the side walls 24. Since the metal material moves from the parts corresponding to the first to third convex sections 51 to 53 toward the parts between the fourth convex sections 70, any tension exerted on the metal material between the fourth convex sections 70, which have been inclined in the initial stage of forming, will not cause necking, which would otherwise occur if the metal material were insufficient in the parts between the fourth convex sections 70. Therefore, unlike the techniques of Japanese Laid-Open Patent Publication No. 2007-48616 and Japanese Laid-Open Patent Publication No. 2014-213343, it is possible to form the sheet metal 21 as a separator, for example, in a single processing step, without diving the forming process into difference steps.

As described above, a single step allows flat sheet metal 21 to be formed into sheet metal 21 having the shape of a separator including bulges 22. This increases the production efficiency and eliminates the need for extensive production equipment. In addition, the sheet metal 21 is subjected only to a single processing step, minimizing physical damages of the sheet metal 21. This improves the characteristics, such as strength and resistance, of the product, such as a separator, formed by the sheet metal 21.

(2) The first convex sections 51 have a large radius of curvature δ51 and extend over large areas. This limits the concentration of stress when the sheet metal 21 is in contact with the first convex sections 51. This further reduces physical damages of the sheet metal 21.

(3) The metal material between the opposed fourth convex sections 70 is rolled by the curved sections of corresponding two fourth convex sections 70. The metal material therefore moves easily and is less resistive to deformation. This reduces the load required for forming and thus the load applied to the forming apparatus 30, eliminating the need for high power to operate the forming apparatus 30. Accordingly, a smaller structure can be used to drive the forming apparatus 30, reducing the energy consumed to form the sheet metal 21. The two corresponding curved sections of each pair of opposed fourth convex sections 70 are offset from each other in the vertical direction, so that the side walls 24 of the sheet metal 21 can be angled to stand. This allows the top sections of the projections 33 and 43 to be widened accordingly, providing a wider area of contact with a diffusion layer or the top sections 221 of another sheet metal 21. Therefore, when the sheet metal 21 is used as a fuel cell separator, the outer surfaces of the top sections 221 are allowed to have a larger area of contact with a diffusion layer of the fuel cell or the top sections of the bulges of another separator. This reduces the electrical resistance and the contact pressure per unit area, thereby limiting buckling of the diffusion layer and the bulges of the separator. In addition, minute vibration and accompanying sliding of the contact surfaces will be reduced. The structure thus helps to achieve a high-performance fuel cell.

(4) When forming the sheet metal 21, the punch 41 does not apply tension to the sheet metal 21 near the bottom dead center. The punch 41 simply presses the sheet metal 21 with its weight. Thus, the load applied to the forming apparatus 30 is reduced in the same manner as described above.

(5) The sheet metal 21 comes into contact with the second convex sections 52 and subsequently with the third convex sections 53, which press the sheet metal 21. This allows the metal material to smoothly move toward the fourth convex sections 70. The structure effectively prevents necking, which would occur if the material in the side walls 24 of the sheet metal 21 were insufficient. The third convex sections 53 have a larger radius of curvature δ53 than the second convex sections 52, thereby limiting concentration of stress acting on the sheet metal 21.

(6) When the punch 41 is at the bottom dead center, a large area of the sheet metal 21 is rolled and formed by the fourth convex sections 70 having a large radius of curvature. Therefore, it is unnecessary to squeeze the metal material with a high pressure between the top sections of the projections 33 and 43 and the bottom sections of the depression 32 and 42 of the die 31 and the punch 41, reducing the burden on the die 31 and the punch 41 and increasing their durability.

(7) When the punch 41 reaches the bottom dead center, the metal material between the first convex sections 51 and the second and third convex sections 52 and 53 and the metal material between the fourth convex sections 70 are rolled, and the excess metal material in these parts moves toward the concave sections 61. This reduces the residual stress in the entire sheet metal 21 including the boundary sections between the top sections and the side walls 24 of the bulges 22 of the sheet metal 21, thereby limiting the spring back effect of the sheet metal 21 after formed. The structure therefore achieves a product that is formed precisely, such as a separator that is free of warpage.

(8) The outer surfaces of the top sections 221 of the bulges 22 of the formed sheet metal 21 have the uneven shape formed by the second and third convex sections 52 and 53 and the concave sections 61. This increases the surface area of the outer surfaces of the top sections 221. Therefore, when the sheet metal 21 is used as a fuel cell separator, the outer surfaces of the top sections 221 are allowed to have a larger area of contact with a diffusion layer of the fuel cell as described above. This reduces the electric resistance and buckling of the diffusion layer, helping to achieve a high-performance fuel cell. The depth of the depressions in the uneven outer surfaces of the top sections 221 of the bulges 22 is set to be within the tolerance of elastic deformation of the diffusion layer.

The present invention is not limited to the above embodiment, but may be modified as follows.

Figure 7:
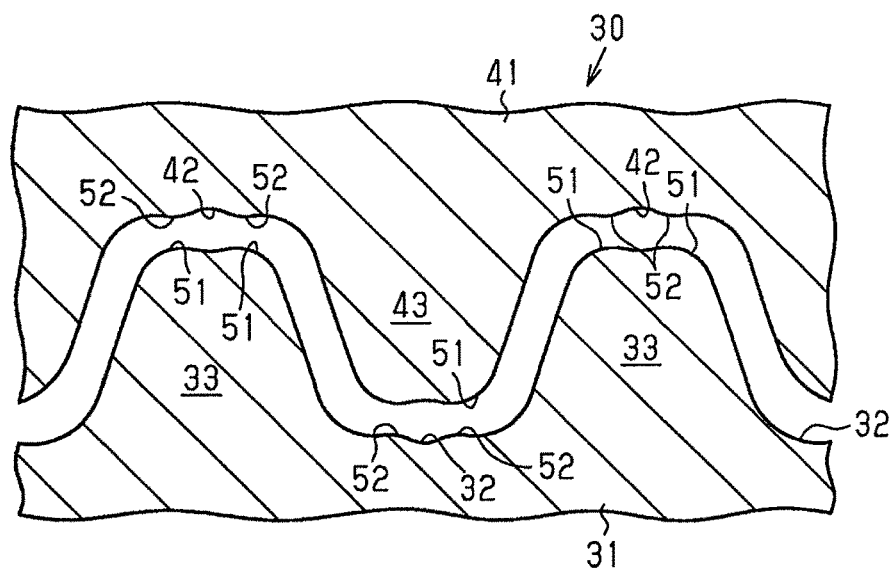
FIG. 7 is a cross-sectional view showing a modification.

As shown in FIG. 7, each of the projections 33 and 43 may include a plurality of first convex sections 51, and each of the depressions 32 and 42 may include a plurality of second convex sections 52 facing the plurality of first convex sections 51.

The sheet metal 21 may be formed into a product other than a fuel cell separator.

The fourth convex sections 70 on the opposite sides of the top section of each of the projections 33 and 43 may be modified from convex surfaces to flat surfaces.

The third convex sections 53 of the depressions 32 and 42 may be omitted, and the second convex sections 52 may be smoothly continuous with the concave sections 61 without any corners formed between them.

The invention claimed is:

1. A sheet metal forming method using a pair of first and second forming dies, which move toward and away from each other, such that the sheet metal includes bulges, which form a series of projections and depressions and each include inclined side walls, the method comprising:
    superposing first convex surfaces of the first forming die with second convex surfaces of the second forming die such that the first convex surfaces coincide with the second convex surfaces in a pressing direction;
    pressing the sheet metal with the first convex surfaces, in the pressing direction, by moving the first and second forming dies toward each other; and
    thereafter, with second convex surfaces, pressing parts of the sheet metal that are opposite to parts that have been pressed by the first convex surfaces, and pressing the side walls between inclined surfaces of the first and second forming dies.

2. The sheet metal forming method according to claim 1, comprising pressing central sections in a width direction of the bulges with the first and second convex surfaces of the first and second forming dies.

3. The sheet metal forming method according to claim 1, wherein the inclined surfaces of the first and second forming dies each include a convex surface having a greater radius of curvature than the first and second convex surfaces.

4. A sheet metal forming apparatus comprising a pair of first and second forming dies, which are moved toward and away from each other to form a sheet metal, wherein
    the first and second forming dies each have a forming surface including a series of alternate depressions and projections,
    an inclined surface is located on each side of each of the depressions and the projections, and
    bottom sections of the depressions and top sections of the projections include convex surfaces that face each other.

5. The sheet metal forming apparatus according to claim 4, wherein the convex surfaces are located in central sections in a width direction of the depressions and the projections.

6. The sheet metal forming apparatus according to claim 5, wherein the inclined surfaces on opposite sides of the top sections of the projections include convex surfaces having a greater radius of curvature than the convex surfaces of the bottom sections of the depressions and the convex surfaces of the top sections of the projections.

7. The sheet metal forming apparatus according to claim 5, wherein the convex surfaces of the bottom sections of the depressions have a smaller radius of curvature than the convex surfaces of the top sections of the projections.

8. The sheet metal forming apparatus according to claim 7, wherein the convex surfaces of the bottom sections of the depressions each include a central section, which has a small radius of curvature, and two side sections, which have a large radius of curvature.

* * * * *